(12) United States Patent
Schulz et al.

(10) Patent No.: US 11,220,594 B2
(45) Date of Patent: Jan. 11, 2022

(54) SCRATCH-RESISTANT STYRENE COPOLYMER COMPOSITION CONTAINING AMIDE WAX

(71) Applicant: INEOS STYROLUTION GROUP GMBH, Frankfurt am Main (DE)

(72) Inventors: Tobias Schulz, Cologne (DE); Norbert Niessner, Friedelsheim (DE); Eike Jahnke, Aubonne (CH); Hans-Werner Schmidt, Bayreuth (DE); Tristan Kolb, Bayreuth (DE)

(73) Assignee: INEOS STYROLUTION GROUP GMBH, Frankfurt am Main (DE)

( * ) Notice: Subject to any disclaimer, the term of this patent is extended or adjusted under 35 U.S.C. 154(b) by 80 days.

(21) Appl. No.: 16/632,916

(22) PCT Filed: Jul. 25, 2018

(86) PCT No.: PCT/EP2018/070144
§ 371 (c)(1),
(2) Date: Jan. 22, 2020

(87) PCT Pub. No.: WO2019/020681
PCT Pub. Date: Jan. 31, 2019

(65) Prior Publication Data
US 2020/0165430 A1    May 28, 2020

(30) Foreign Application Priority Data
Jul. 26, 2017 (EP) .................... 17183286

(51) Int. Cl.
| | |
|---|---|
| *C08L 25/08* | (2006.01) |
| *C08K 3/013* | (2018.01) |
| *B29C 45/00* | (2006.01) |
| *C08F 212/08* | (2006.01) |
| *C08F 220/18* | (2006.01) |
| *C08F 220/44* | (2006.01) |
| *C08K 5/00* | (2006.01) |
| *C08K 5/20* | (2006.01) |
| *C08L 23/00* | (2006.01) |
| *C08L 69/00* | (2006.01) |
| *C08L 77/00* | (2006.01) |

(52) U.S. Cl.
CPC .......... *C08L 25/08* (2013.01); *B29C 45/0001* (2013.01); *C08F 212/08* (2013.01); *C08F 220/18* (2013.01); *C08F 220/44* (2013.01); *C08K 3/013* (2018.01); *C08K 5/0041* (2013.01); *C08K 5/20* (2013.01); *C08L 23/00* (2013.01); *C08L 69/00* (2013.01); *C08L 77/00* (2013.01); *C08L 2201/00* (2013.01); *C08L 2203/20* (2013.01); *C08L 2205/03* (2013.01)

(58) Field of Classification Search
CPC .. C08K 5/10; C08K 5/101; C08K 5/20; C08L 25/08; C08L 25/12; C08L 25/14; C08L 25/16
See application file for complete search history.

(56) References Cited

U.S. PATENT DOCUMENTS

| | | |
|---|---|---|
| 8,183,312 B2 | 5/2012 | Pham et al. |
| 2008/0242779 A1 | 10/2008 | Gaggar et al. |
| 2015/0152257 A1 | 6/2015 | Sawasato et al. |
| 2015/0274948 A1 | 10/2015 | Fukuda et al. |

FOREIGN PATENT DOCUMENTS

| | | | |
|---|---|---|---|
| CA | 2763765 A1 | | 12/2010 |
| EP | 2279225 B1 | | 7/2013 |
| EP | 2217689 B1 | | 11/2016 |
| JP | 59196349 A | * | 11/1984 |
| JP | H05140384 A | | 6/1993 |
| JP | 2006143945 A | | 6/2006 |
| JP | 2006233112 A | * | 9/2006 |
| JP | 2007320994 A | | 12/2007 |
| WO | 01/90231 A1 | | 11/2001 |
| WO | 2009/053686 A1 | | 4/2009 |
| WO | 2009/138211 A1 | | 11/2009 |
| WO | 2016/134240 A1 | | 8/2016 |

OTHER PUBLICATIONS

JP 59196349 A Machine Translation (Nov. 1984).*
Written Opinion of the International Searching Authority for PCT/EP2018/070144 dated Jan. 31, 2019.

* cited by examiner

*Primary Examiner* — Ana L. Woodward
(74) *Attorney, Agent, or Firm* — J.A. Lindeman & Co. PLLC; Aaron Raphael

(57) ABSTRACT

Scratch-resistant thermoplastic polymer compositions (P) comprising 90 to 99.9 wt.-% of at least one styrene-based copolymer, 0.1 to 10 wt.-% of an aliphatic amide wax additive comprising at least one aliphatic amide wax composition having a melting point in the range of 80° C. to 115° C., and optionally at least one colorant, dye, pigment and/or further additive, have improved properties.

20 Claims, No Drawings

SCRATCH-RESISTANT STYRENE COPOLYMER COMPOSITION CONTAINING AMIDE WAX

The invention relates to a thermoplastic polymer composition (P) comprising at least one styrene-based polymer (A) and at least one aliphatic amide wax additive (B). The thermoplastic polymer composition (P) is characterized by having improved scratch-resistance.

Styrene copolymers are widely used in many applications, e.g. in automotive industry or for household goods The popularity of these thermoplastic polymer compositions may be attributed to their balanced properties of good melt flow characteristics which is an important feature for injection molding processes, combined with a competitive price and good UV resistance.

However, as with many polymers the resistance of conventional styrene copolymers against scratch and abrasion is very low. In view of this, alternative solutions have been established in the art for the provision of scratch-resistant surfaces of polymer articles. One solution was found in the application of poly(methyl methacrylate) (PMMA) as base polymer of the respective articles. PMMA is characterized by having good scratch resisting properties. However, compared to polystyrene and styrene copolymers, PMMA is a rather expensive material. A further solution to the above-mentioned problem is to apply a scratch-resistant curable coating (e.g. a UV-curable coating) on the surface of the polymer article. This approach, however, is typically also expensive and requires an additional processing step resulting in higher cycle time.

Different thermoplastic polymer compositions comprising amide compounds are known in the art. CA 2 763 765 discloses branched, saturated primary fatty acid amides and their use as slip agent, anti-blocking agent of mold release agent. The branched, saturated primary fatty acid amides are represented by the formula R—CO—$NH_2$, wherein i) R is a saturated, branched hydrocarbon chain having 11 to 23 carbon atoms; ii) at least 60% by weight of the R—CO—$NH_2$ molecules are mono-alkyl branched, said mono-alkyl branches comprising methyl branches and ethyl branches; and iii) less than 25% by weight of the R—CO—$NH_2$ molecules are poly-alkyl branched.

EP-A 2 217 689 relates to the use of non-ionic fatty amino-amide/esters in a method of cleaning and conditioning textiles which comprises a wash cycle in which the textiles are contacted with water, at least one detergent surfactant and at least one non-ionic fatty amino-amide/ester fabric conditioner.

U.S. Pat. No. 8,183,312 discloses polypropylene molded parts comprising a) a polypropylene substrate and incorporated therein a combination of b) an $\alpha,\beta$-unsaturated carboxylic reagent functionalized olefin polymer or copolymer, c) a primary or secondary fatty acid amide and d) a nucleating agent selected from the group consisting of sodium benzoate, 2,2'-methylene-bis(4,6-di-tert-butylphenyl)phosphate, zinc glycerolate, calcium salt of 1,2-dicarboxylic acid cyclohexane and sodium salt of 1,2-dicarboxylic acid norbornane. The molded part is reported to have scratch resistant properties.

US 2015/274948 is concerned with a polypropylene resin composition comprising a polypropylene resin, an ethylene $\alpha$-olefin copolymer having an ethylene content of 65 mol % to 90 mol % and including ethylene and at least one $\alpha$-olefin selected from $\alpha$-olefins having 3 to 8 carbon atoms, an inorganic filler, a fatty acid amide, and a surfactant.

EP-A 2 279 225 relates to a scratch-resistant molded article made from a filled polypropylene composition. The article is characterized in comprising at least one crystallisable polypropylene, glass fibres having average length of 1-50 mm, oleamide and/or erucamide, and other additives.

JP 2007320994 relates to a thermoplastic resin composition containing a rubber-containing graft polymer prepared by graft polymerization of a rubbery polymer and an aromatic vinyl monomer or a vinyl monomer mixture containing an aromatic vinyl monomer, a styrene-conjugated diene copolymer having a durometer A hardness of 20-80 and/or a hydrogenated material thereof, and an aliphatic amide. The composition is reported to have improved characteristics with respect to flexibility, thermal fusibility, and scratch resistance.

JP 2006143945 discloses a thermoplastic elastomer composition containing a styrene-based thermoplastic elastomer as a main component and further a graft copolymer composition composed of components (A) and (B) or components (A), (B), and (C), wherein the component (A) comprises a multiphase structure-type graft copolymer which contains an olefin-based polymer segment (a) as a stem component and a vinyl-based polymer segment (b) formed out of at least one kind of vinyl-based monomer as a branch component and forms such a dispersed phase that one of the segments is dispersed in the other segment as a fine particle having a particle diameter of 0.001-10 μm, the component (B) comprises a fatty acid amide formed out of a 10-25° C. fatty acid, and the component (C) comprises a copolymer formed out of ethylene and at least one kind of vinyl monomer. The composition is reported to have improved characteristics with respect to moldability, scratch resistance and abrasion resistances.

JP 000H05140384 relates to a polymer composition comprising a hydrogenated derivative of a block copolymer expressed by the formula A-B-A (A is styrene polymer block; B is elastomeric copolymer block of isoprene), a polypropylene-based resin, a softening agent for petroleum-based rubbers and higher fatty acid amide such as oleamide. The composition is reported to have improved characteristics with respect to flexibility, low-temperature impact properties, molding processability, abrasion and scuff resistances.

In view of the prior art, it was one objective of the present invention to provide a styrene-based thermoplastic polymer composition (P) with high scratch resistance without the need of an expensive coating process.

DISCLOSURE OF THE INVENTION

The present invention relates to a thermoplastic polymer composition (P) comprising (or consisting of):

(A) 90 to 99.9 wt.-%, preferably 93 to 99.9 wt.-%, in particular 95 to 99.8 wt.-%, of at least one styrene-based copolymer;

(B) 0.1 to 10 wt.-%, preferably 0.1 to 7 wt.-%, in particular 0.2 to 2 wt.-%, of an aliphatic amide wax additive comprising at least one aliphatic amide wax composition (B-1) having a melting point in the range of 80° C. to 115° C., preferably 90° C. to 110° C., and most preferably 100° C. to 108° C.;

(C) 0 to 9.9 wt.-%, preferably 0.1 to 5 wt.-%, in particular 0.5 to 5 wt.-%, of at least one colorant, dye or pigment; and (D) 0 to 3 wt.-%, preferably 0.1 to 3 wt.-%, in particular 0.5 to 3 wt.-%, at least one further additive;

wherein the constituents (A) to (D) sum up to 100 wt.-% of the thermoplastic polymer composition (P). In one embodiment, the composition comprises at least 0.1 wt.-% of component C or at least 0.1 wt.-% of component D and up to 99.8 wt.-% of component A.

It was surprisingly found, that the poor scratch resistance properties of styrene-based copolymers can be significantly improved by the addition of small amounts of 0.1 to 10 wt.-% of an aliphatic amide wax additive comprising at least one aliphatic amide wax composition (B-1) having a melting point in the range of 80° C. to 115° C., preferably 90° C. to 110° C., and most preferably 100° C. to 108° C.

In one embodiment of the invention, the thermoplastic polymer composition (P) comprises (or consists of):
(A) 93 to 99.9 wt.-% of at least one styrene-based copolymer;
(B) 0.1 to 7 wt.-% of an aliphatic amide wax additive comprising at least one aliphatic amide wax composition (B-1) having a melting point in the range of 80° C. to 115° C.;
(C) 0 to 6.9 wt.-% at least one colorant, dye or pigment; and
(D) 0 to 3 wt.-% at least one further additive;
wherein the constituents (A) to (D) sum up to 100 wt.-% of the thermoplastic polymer composition (P).

In a further embodiment, the thermoplastic polymer composition (P) comprises (or consists of):
(A) 95 to 99.8 wt.-% of at least one styrene-based copolymer;
(B) 0.2 to 5 wt.-% of an aliphatic amide wax additive comprising at least one aliphatic amide wax composition (B-1) having a melting point in the range of 80° C. to 115° C.;
(C) 0 to 4.8 wt.-% at least one colorant, dye or pigment; and
(D) 0 to 3 wt.-% at least one further additive;
wherein the constituents (A) to (D) sum up to 100 wt.-% of the thermoplastic polymer composition (P).

In a further embodiment, the thermoplastic polymer composition (P) comprises (or consists of):
(A) 95 to 99.8 wt.-% of at least one styrene-based copolymer;
(B) 0.2 to 2 wt.-% of an aliphatic amide wax additive comprising at least one aliphatic amide wax composition (B-1) having a melting point in the range of 80° C. to 115° C.;
(C) 0 to 4.8 wt.-% at least one colorant, dye or pigment; and
(D) 0 to 3 wt.-% at least one further additive;
wherein the constituents (A) to (D) sum up to 100 wt.-% of the thermoplastic polymer composition (P).

In an alternative preferred embodiment of the invention, the thermoplastic polymer composition (P) comprises (or consists of):
(A) 93 to 99.3 wt.-% of at least one styrene-based copolymer;
(B) 0.2 to 7 wt.-% of an aliphatic amide wax additive comprising at least one aliphatic amide wax composition (B-1) having a melting point in the range of 80° C. to 115° C.;
(C) 0.5 to 6.8 wt.-% at least one colorant, dye or pigment; and
(D) 0 to 3 wt.-% at least one further additive;
wherein the constituents (A) to (D) sum up to 100 wt.-% of the thermoplastic polymer composition (P).

In a further alternative preferred embodiment of the invention, the thermoplastic polymer composition (P) comprises (or consists of):
(A) 93 to 99.3 wt.-% of at least one styrene-based copolymer;
(B) 0.2 to 7 wt.-% of an aliphatic amide wax additive comprising at least one aliphatic amide wax composition (B-1) having a melting point in the range of 80° C. to 115° C.;
(C) 0 to 6.3 wt.-%, often 0.5 to 6.3 wt-%, at least one colorant, dye or pigment; and
(D) 0.5 to 3 wt.-% at least one further additive;
wherein the constituents (A) to (D) sum up to 100 wt.-% of the thermoplastic polymer composition (P).

In a further preferred embodiment of the invention, the thermoplastic polymer composition (P) comprises (or consists of):
(A) 95 to 98.8 wt.-% of at least one styrene-based copolymer;
(B) 0.2 to 4 wt.-% of an aliphatic amide wax additive comprising at least one aliphatic amide wax composition (B-1) having a melting point in the range of 80° C. to 115° C.;
(C) 0.5 to 4.3 wt.-% at least one colorant, dye or pigment; and
(D) 0.5 to 3 wt.-% at least one further additive;
wherein the constituents (A) to (D) sum up to 100 wt.-% of the thermoplastic polymer composition (P).

In the following, the components/constituents (A) to (D) are described in further detail.

Styrene-Based Copolymer (Constituent A)

The thermoplastic copolymer composition (P) comprises 90 to 99.9 wt.-%, based on the total weight of the thermoplastic copolymer composition (P), of at least one styrene-based copolymer (A). Preferably, the at least one styrene-based copolymer (A) comprised in the thermoplastic copolymer composition in amounts of 93 to 99.8 wt.-% and in particular 95 to 99.8 wt.-%, based on the total weight of the thermoplastic copolymer composition (P).

Styrene-based copolymers (A) are well known in the art and typically represent copolymers of styrene and/or α-methyl styrene with suitable co-monomers. In a preferred embodiment, co-monomers having polar functional groups are preferred, e.g. as acrylonitrile, meth acrylonitrile, methyl methacrylate, maleic acid anhydride and N-phenylmaleimide. Particular preferred co-monomers are acrylonitrile, meth acrylonitrile, and methyl methacrylate. Most preferred co-monomers are acrylonitrile and methyl methacrylate. Particular suitable styrene-based copolymers (A) within the meaning of this invention are thus copolymers from styrene and/or α-methyl styrene and acrylonitrile and/or methyl methacrylate as co-monomer.

In a preferred embodiment, the styrene-based copolymer comprises no impact-modified styrene-based copolymer or rubber-modified styrene-based copolymer.

In a further preferred embodiment of the invention, the thermoplastic polymer composition (P) comprises at least one styrene-based copolymer (A) selected from poly(styrene-co-acrylonitrile) (SAN), poly(α-methyl styrene-co-acrylonitrile) (AMSAN), poly(styrene-co-methyl methacrylate) (SMMA) and mixtures thereof.

Poly(styrene-acrylonitrile) (SAN) and/or poly(α-methyl styrene/acrylonitrile) (AMSAN) are copolymers known in the art. In general, any SAN and/or AMSAN copolymer known in the art may be used within the subject-matter of the present invention.

In a preferred embodiment, the SAN and AMSAN copolymers of the present invention contain:
from 50 to 99 wt.-%, based on the total weight of the SAN and/or AMSAN copolymer, of at least one member selected from the group consisting of styrene and α-methyl styrene, and from 1 to 50 wt.-%, based on the total weight of the SAN and/or AMSAN copolymer, of acrylonitrile.

The weight average molecular weight (as determined by gel permeation chromatography relative to polystyrene as standard and THF as solvent) of the SAN or AMSAN copolymer is often in the range of 15,000 to 200,000 g/mol, preferably in the range of 30,000 to 150.000 g/mol.

Particularly preferred ratios by weight of the components making up the SAN or AMSAN copolymer are 60 to 95 wt.-%, based on the total weight of the SAN and/or AMSAN copolymer, of styrene and/or α-methyl styrene and 40 to 5 wt.-%, based on the total weight of the SAN and/or AMSAN copolymer, of acrylonitrile.

Particularly preferred are SAN or AMSAN containing proportions of incorporated acrylonitrile monomer units of <36 wt.-%, based on the total weight of the SAN and/or AMSAN copolymer.

Preferred are copolymers as component made from, based on from 65 to 81 wt.-%, based on the total weight of the SAN and/or AMSAN copolymer, of at least one member selected from the group consisting of styrene and α-methyl styrene, and from 19 to 35 wt.-%, based on the total weight of the SAN and/or AMSAN copolymer, of acrylonitrile.

Among the afore-mentioned, most preferred SAN or AMSAN copolymers, those having a viscosity number VN (determined according to DIN 53726 at 25° C., 0.5% by weight in dimethylformamide) of from 50 to 120 ml/g are in particular preferred.

The copolymers of SAN or AMSAN component are known and the methods for their preparation, for instance, by radical polymerization, more particularly by emulsion, suspension, solution and bulk polymerization are also well documented in the literature.

Details concerning the production of these resins are described for example in U.S. Pat. Nos. 4,009,226 and 4,181,788. Vinyl resins produced by bulk polymerization or solution polymerization have proved to be particularly suitable. The copolymers may be added alone or as an arbitrary mixture. Poly(styrene-co-methyl methacrylate) (SMMA) within the meaning of the present invention is any copolymer of methyl methacrylate and styrene. Typical SMMA copolymers are known in the art. In general, any SMMA copolymer known in the art may be used within the subject-matter of the present invention.

In a preferred embodiment, the SMMA copolymer comprises at least one copolymer obtained by the polymerization of 70 to 90 wt.-%, based on the total weight of the monomer composition, of styrene and 10 to 30 wt.-%, based on the total weight of the monomer composition, of methyl methacrylate.

In a further preferred embodiment, the amount of styrene is from 70 to 85 wt.-% and the amount of methyl methacrylate is from 15 to 30 wt.-%. In particular preferred SMMA copolymers, the amount of styrene is from 70 to 80 wt.-% and the amount of methyl methacrylate is from 20 to 30 wt.-%. Most preferred are SMMA copolymers wherein the amount present of styrene is from 74 to 80 wt.-% and the amount present of methyl methacrylate is from 20 to 26 wt.-%.

Aliphatic Amide Wax Additive (Constituent B)

The thermoplastic copolymer composition (P) comprises 0.1 to 10 wt.-%, based on the total weight of the thermoplastic copolymer composition (P), of an aliphatic amide wax additive (B). Preferably, the thermoplastic copolymer composition (P) comprises 0.1 to 7 wt.-%, more preferably 0.2 to 5 wt.-% and in particular 0.2 to 2 wt.-% of an aliphatic amide wax additive (B).

The aliphatic amide wax additive (B) comprises at least one aliphatic amide wax composition (B-1) having a melting point in the range of 80° C. to 115° C., preferably from 90° C. to 110° C., and most preferably from 100° C. to 108° C.

In a further embodiment of the invention, the aliphatic amide wax additive may further comprise at least one aliphatic fatty acid ester composition (B-2) having a melting point in the range of 35° C. to 60° C., preferably 40° C. to 50° C. It was found that, if a mixture of (B-1) and (B 2) is employed, the weight ratio of the aliphatic amide wax composition (B-1) to the aliphatic fatty acid ester composition (B-2) is preferably at least 0.9:1, more preferably in range of from ≥0.9:1 to ≤2.2:1, and in particular from ≥1:1 to ≤2:1. It was found that this weight ratio results in improved scratch resistance.

In this case, the amount of aliphatic amide wax additive (B) is preferably in the range from 0.5 to 2 wt.-%, more preferred in the range from 0.9 to 2 wt.-% and in particular in the range from 1.2 to 1.7 wt.-%, based on the total weight of the thermoplastic polymer composition (P). Accordingly, the amount of the aliphatic amide wax composition (B-1) is preferably in the range from 0.75 to 1.25 wt.-%, in particular 0.9 to 1.1 wt.-%, based on the total weight of the thermoplastic polymer composition (P), and the amount of the aliphatic fatty acid ester composition (B-2) is preferably in the range from 0.15 to 0.75 wt.-%, in particular 0.3 to 0.6 wt.-%, based on the total weigh of the thermoplastic polymer composition (P).

However, in one embodiment of the invention, the aliphatic amide wax additive (B) comprises only aliphatic amide wax compositions (B-1). It was found that in the absence of aliphatic fatty acid ester compositions (B-2), amounts of the aliphatic amide wax additive (B) of 0.1 to 1.5 wt.-%, preferably 0.2 to 0.6 wt.-%, often 0.2 to 0.5 wt.-%, and in particular 0.2 to 0.4 wt.-%, based on the total weight of the thermoplastic polymer composition (P), are sufficient to achieve excellent improvements in scratch resistance.

In a further preferred embodiment of the invention, the at least one aliphatic amide wax composition (B-1) comprises amide compounds having the formula $R^1$—CONH—$R^2$, wherein $R^1$ and $R^2$ are each independently selected from aliphatic, saturated or unsaturated hydrocarbon groups having 1 to 30 carbon atoms, preferably 12 to 24 carbon atoms, in particular 16 to 20 carbon atoms.

In a particular preferred embodiment, the at least one aliphatic amide wax composition (B-1) comprises at least one amide compound derived from stearic acid, i.e. at least one amide compound wherein $R^1$ represents an aliphatic, saturated hydrocarbon group having 17 carbon atoms. In this case, $R^2$ preferably represents an aliphatic, saturated hydrocarbon group having 16 to 20 carbon atoms.

In a further preferred embodiment of the invention, the at least one aliphatic fatty acid ester composition (B-2)—if present—comprises fatty acid ester compounds having the formula $R^3$—CO—$OR^4$, wherein $R^3$ and $R^4$ are each independently selected from aliphatic, saturated or unsaturated hydrocarbon groups having 1 to 45 carbon atoms, preferably 15 to 40 carbon atoms, in particular 25 to 35 carbon atoms.

Dyes, Pigments, Colorants (Constituent C)

The thermoplastic polymer composition (P) may further comprise 0 to 9.9 wt.-%, preferably 0.1 to 7 wt.-% and in particular 0.5 to 5 wt.-% of dyes, pigments, or colorants (C) which may be added in form of master batches comprising the dyes, pigments, or colorants (C) in a polymer matrix.

In a preferred embodiment, the dyes, pigments, or colorants (C) are added in form of a master batch comprising 20 to 70 wt.-%, preferably 40 to 60 wt.-%, based on the total amount of the master batch, of dyes, pigments, colorants (C) or mixtures thereof and 30 to 80 wt.-%, preferably 40 to 60 wt.-%, based on the total amount of the master batch, a copolymer of an vinyl aromatic olefin and acrylonitrile as matrix polymer. Preferably, the matrix polymer is selected from poly(styrene-acrylonitrile) (SAN), poly(α-methyl styrene/acrylonitrile) (AMSAN), and/or poly(styrene-methyl methacrylate) (SMMA).

Examples of suitable pigments include titanium dioxide, phthalocyanines, ultramarine blue, iron oxides or carbon black, and also the entire class of organic pigments.

Examples of suitable colorants include all dyes that may be used for the transparent, semi-transparent, or non-transparent coloring of polymers, in particular those suitable for coloring styrene copolymers.

Additives (Constituent D)

Various additives (D) may be added to the molding compounds in amounts of from 0 to 3 wt. %, often from 0.1 to 3 wt. % or from 0.5 to 3 wt. %, as assistants and processing additives. Suitable additives (D) include all substances customarily employed for processing or finishing the polymers. In general, the presence of aliphatic amide wax additives (B) does not exclude the presence of additives (D) comprising amide waxes which are different from the aliphatic amide wax additives (B). These are typically used as mold release agents.

Additives (D) may be added in form of master batches comprising additives (D) in a polymer matrix. In a preferred embodiment, the additives (D) are added in form of a master batch comprising 20 to 70 wt.-%, preferably 40 to 60 wt.-%, based on the total amount of the master batch, of additives (D) or mixtures thereof and 30 to 80 wt.-%, preferably 40 to 60 wt.-%, based on the total amount of the master batch, a copolymer of an vinylaromatic olefin and acrylonitrile as matrix polymer. Preferably, the matrix polymer is selected from poly(styrene-acrylonitrile) (SAN), poly(α-methyl styrene/acrylonitrile) (AMSAN), and/or poly(styrene-methyl methacrylate) (SMMA).

Examples include, for example, antistatic agents, antioxidants, flame retardants, stabilizers for improving thermal stability, stabilizers for increasing photostability, stabilizers for enhancing hydrolysis resistance and chemical resistance, anti-thermal decomposition agents and in particular lubricants that are useful for production of molded bodies/articles.

These further added substances may be admixed at any stage of the manufacturing operation, but preferably at an early stage in order to profit early on from the stabilizing effects (or other specific effects) of the added substance. For further customary assistants and added substances, see, for example, "Plastics Additives Handbook", Ed. Hans Zweifel, 6th Edition, Hanser Publishers, Munich, 2009.

Examples of suitable antistatic agents include amine derivatives such as N,N-bis(hydroxyalkyl)alkylamines or -alkyleneamines, polyethylene glycol esters, copolymers of ethylene oxide glycol and propylene oxide glycol (in particular two-block or three-block copolymers of ethylene oxide blocks and propylene oxide blocks), and glycerol mono- and distearates, and mixtures thereof.

Examples of suitable antioxidants include sterically hindered monocyclic or polycyclic phenolic antioxidants which may comprise various substitutions and may also be bridged by substituents. These include not only monomeric but also oligomeric compounds, which may be constructed of a plurality of phenolic units. Hydroquinones and hydroquinone analogs are also suitable, as are substituted compounds, and also antioxidants based on tocopherols and derivatives thereof. It is also possible to use mixtures of different antioxidants. It is possible in principle to use any compounds which are customary in the trade or suitable for styrene copolymers, for example antioxidants from the Irganox range. In addition to the phenolic antioxidants cited above by way of example, it is also possible to use so-called co-stabilizers, in particular phosphorus- or sulfur-containing co-stabilizers. These phosphorus- or sulfur-containing co-stabilizers are known to those skilled in the art.

Examples of suitable flame retardants that may be used include the halogen-containing or phosphorus-containing compounds known to the person skilled in the art, magnesium hydroxide, and also other commonly used compounds, or mixtures thereof.

Examples of suitable light stabilizers include various substituted resorcinols, salicylates, benzotriazoles and benzophenones.

Suitable matting agents include not only inorganic substances such as talc, glass beads or metal carbonates (for example $MgCO_3$, $CaCO_3$) but also polymer particles, in particular spherical particles having diameters D50 greater than 1 µm, based on, for example, methyl methacrylate, styrene compounds, acrylonitrile or mixtures thereof. It is further also possible to use polymers comprising copolymerized acidic and/or basic monomers.

Examples of suitable antidrip agents include polytetrafluoroethylene (Teflon) polymers and ultrahigh molecular weight polystyrene (weight-average molecular weight Mw above 2,000,000 g/mol).

Examples of fibrous/pulverulent fillers include carbon or glass fibers in the form of glass fabrics, glass mats, or filament glass rovings, chopped glass, glass beads, and wollastonite, particular preference being given to glass fibers. When glass fibers are used they may be finished with a sizing and a coupling agent to improve compatibility with the blend components. The glass fibers incorporated may either take the form of short glass fibers or else continuous filaments (rovings).

Examples of suitable particulate fillers include carbon black, amorphous silica, magnesium carbonate, powdered quartz, mica, bentonites, talc, feldspar or, in particular, calcium silicates, such as wollastonite, and kaolin.

Examples of suitable stabilizers include hindered phenols but also vitamin E and compounds having analogous structures and also butylated condensation products of p-cresol and dicyclopentadiene.

HALS stabilizers (Hindered Amine Light Stabilizers), benzophenones, resorcinols, salicylates, benzotriazoles are also suitable. Other suitable compounds include, for example, thiocarboxylic esters. Also usable are $C_6$-$C_{20}$ alkyl esters of thiopropionic acid, in particular the stearyl esters and lauryl esters. It is also possible to use the dilauryl ester of thiodipropionic acid (e.g. dilauryl thiodipropionate), the distearyl ester of thiodipropionic acid (e.g. distearyl thiodipropionate) or mixtures thereof. Examples of further additives include HALS absorbers, such as bis(2,2,6,6-tetramethyl-4-piperidyl) sebacate or UV absorbers such as 2H-benzotriazol-2-yl-(4-methylphenol).

Suitable lubricants and demolding agents include stearic acids, stearyl alcohol, stearic esters, amide waxes (bis (stearylamide)), polyolefin waxes and/or generally higher fatty acids, derivatives thereof and corresponding fatty acid mixtures comprising 12 to 30 carbon atoms. Also particularly suitable is ethylene-bis(stearamide).

Preparation of the Thermoplastic Polymer Composition (P)

The invention also relates to a process for preparing a thermoplastic polymer composition (P) disclosed above, wherein the process comprises at least the following steps:
a) Providing the components (A) to (D) in the predetermined amounts to an optionally heatable mixing device; and
b) Blending the components (A) to (D) in the optionally heatable mixing device at temperatures above the glass transition point of the components (A) to (D) to obtain the thermoplastic polymer composition (P).

Optionally, a step in which a homogenous particulate material mixture is prepared from the components (A) to (D) may be carried out prior to step b). However, also when provided to the optionally heatable mixing device without previous mixing, a homogenous mixing is typically achieved in the optionally heatable mixing device.

Components (A) to (D) are typically provided in form of particulate materials having different particle sizes and particle size distributions. Typically, the components are provided in form of powders and/or granules. These may, for example, be chosen with respect to their commercial availability.

The particulate constituents (A) to (D) are provided to a mixing device in the required amounts and ratios as previously indicated and optionally mixed prior to the blending step b) in order to obtain a homogenous particulate material mixture. This may require 1 to 60, preferably 1 to 20, in particular 2 to 10 minutes, depending to the amount of particulate material to be mixed.

The thus obtained homogenous particulate material mixture is then transferred to an optionally heatable mixing apparatus and blended therein, producing a substantially liquid-melt polymer mixture.

"Substantially liquid-melt" means that the polymer mixture, as well as the predominant liquid-melt (softened) fraction, may further comprise a certain fraction of solid constituents, examples being unmelted fillers and reinforcing material such as glass fibers, metal flakes, or else unmelted pigments, colorants, etc. "Liquid-melt" means that the polymer mixture is at least of low fluidity, therefore having softened at least to an extent that it has plastic properties.

Mixing apparatuses used are those known to the skilled person. Components (A) and (B), and—where included—(C) and/or (D) may be mixed, for example, by joint extrusion, kneading, or rolling, the aforementioned components necessarily having been isolated from the aqueous dispersion or from the aqueous solution obtained in the polymerization.

Examples of mixing apparatus for implementing the method includes discontinuously operating, heated internal kneading devices with or without RAM, continuously operating kneaders, such as continuous internal kneaders, screw kneaders with axially oscillating screws, Banbury kneaders, furthermore extruders, and also roll mills, mixing roll mills with heated rollers, and calenders.

A preferred mixing apparatus used is an extruder or a kneader. Particularly suitable for melt extrusion are, for example, single-screw or twin-screw extruders. A twin-screw extruder is preferred.

In some cases the mechanical energy introduced by the mixing apparatus in the course of mixing is enough to cause the mixture to melt, meaning that the mixing apparatus does not have to be heated. Otherwise, the mixing apparatus is generally heated.

The temperature is guided by the chemical and physical properties of the styrene-based copolymer (A) and the inorganic metal nanoparticles (B) and—when present—the colorant, dye and/or pigment (C) and/or the further additives (D), and should be selected such as to result in a substantially liquid-melt polymer mixture. On the other hand, the temperature is not to be unnecessarily high, in order to prevent thermal dam-age of the polymer mixture. The mechanical energy introduced may, however, also be high enough that the mixing apparatus may even require cooling. Mixing apparatus is operated customarily at 150° C. to 400° C., preferably 170° C. to 300° C.

In a preferred embodiment a heatable twin-screw extruder and a speed of 50 to 150 rpm, preferably 60 to 100 rpm is employed. Preferably, an extruding temperature of 170° C. to 270° C., preferably 210° C. to 250° C. is employed to obtain the thermoplastic polymer composition (P). The thermoplastic polymer composition (P) may be directly used, e.g. in molding processes, preferably injection molding processes, or may be processed to form granules which may be subjected to molding processes afterwards. The molding processes are preferably carried out at temperatures of 170° C. to 270° C., in particular 210° C. to 250° C. to result in polymer molded articles.

A further object of the invention is a polymer composition, comprising 50 to 99 wt.-% of the inventive thermoplastic polymer composition (P) and 50 to 1 wt.-% of at least one further thermoplastic polymer. In a preferred embodiment, the at least one further thermoplastic polymer is selected from styrene-based copolymers other than the styrene-based copolymer (A) (e.g. SAN, AMSAN or SMMA), polyolefins (e.g. polyethylene, polypropylene), polycarbonates, polyamides and mixtures thereof.

The invention further relates to a molded article, prepared from a thermoplastic polymer composition (P) or a polymer composition, comprising a thermoplastic polymer composition (P) in combination with a further thermoplastic polymer as described above. The molded article may be prepared by any known processes for thermoplastic processing. In particular preparation may be effected by thermoforming, extruding, injection molding, calendaring, blow molding, compression molding, press sintering, deep drawing or sintering, preferably by injection molding.

The thermoplastic polymer composition (P) and the molded articles are advantageously used for the manufacture of components or articles for electronic devices, household goods and automotive parts, in particular for the manufacture of visible components or articles. A preferred application is the use in A/B/C pillars of automobiles.

Properties

The properties of the thermoplastic polymer composition (P) according to the present invention were determined. It was surprisingly found that the thermoplastic polymer composition (P) comprising 0.1 to 10 wt.-% of an aliphatic amide wax additive (B) comprising at least one aliphatic amide wax composition (B-1) having a melting point in the range of 80° C. to 115° C. exhibit improved scratch resistance compared to polymer compositions comprising only styrene-based copolymers (A).

It was observed that the thermoplastic polymer composition (P) according to the invention in a scratch resistance test following ISO 1518-1 realized with an Erichsen Linear Tester preferably requires a minimum normal load of at least 300 g, more preferably of at least 500 g and in particular of at least 600 g to achieve a full scratch mark on the surface of the sample. By contrast, the minimum normal load necessary to achieve a full scratch mark on the surface of the sample of the styrene-based copolymer (A) in the absence of the aliphatic amide wax additive (B) is considerably lower.

Moreover, it was found that the scratch resistance may also be increased by adding an aliphatic amide wax additive (B) comprising a mixture of two different aliphatic compositions, namely least one aliphatic amide wax composition (B-1) having a melting point in the range of 80° C. to 115° C. and at least one aliphatic fatty acid ester composition (B-2) having melting point in the range of 35° C. to 60° C., preferably in a weight ratio of (B-1) to (B-2) of ≥0.9:1 to ≤2.2:1, in particular ≥1:1 to ≤2:1.

The invention is further illustrated by the examples and claims.

EXAMPLES

Materials
Constituent A:
A-1: SAN copolymer with an acrylonitrile content of 24 wt.-% and a viscosity number VN of 80 ml/g.
A-2: AMSAN copolymer with an acrylonitrile content of 30 wt.-%, having a viscosity number VN of 57 ml/g and a Vicat softening temperature (VST B50) of 120° C. (commercially available as Luran® HH-120 from INEOS Styrolution, Germany).
A-3: SMMA copolymer having a melt volume-flow rate (MVR 220/10) of 30 ml/10 min, and a Vicat softening temperature (VST B50) of 98° C. (commercially available as NAS® 30 from INEOS Styrolution, Germany).
A*: PMMA having a melt volume-flow rate (MVR 230° C./3.8 kg) of 6 ml/10 min, a Vicat softening temperature (VST B50) of 106° C., and a refractive index of 1.49, a density of 1.19 g/ml (commercially available as PMMA 7N from Evonik Industries AG, Germany).
Constituent B:
B-1: an aliphatic amide wax composition derived from stearic acid having a melting point of 102-106° C., and a density of 0.87 g/cm$^3$ (e.g. commercially available Incro-Max® PS from Croda International, UK.
B-2: an aliphatic fatty acid ester composition having a melting point of 42-50° C., and a density 0.92 g/cm$^3$ (e.g. commercially available IncroMax® 100 from Croda International, UK.

Constituent C
C-1: Carbon Black (20 wt.-% in a SAN copolymer based on the total weight of C-1).
C-2: Colorant composition comprising 21.78 wt.-% Pyrazolone Yellow, 62.10 wt.-% Allizarin Blue, 8.06 wt.-% Alizarin Violet and 8.06 wt.-% Carbon Black, based on the total weight of C-2.
Constituent D
D-1 Additive composition comprising 35.56 wt.-% Tinuvin 770 (HALS), 21.48 wt.-% UV Stabilizer Chimasorb 944 and 42.96 wt.-% UV Stabilizer Cyasorb 3853 (50 wt.-% in polypropylene), based on the total weight of D-1.
Sample Preparation Examples 1 and 2 were prepared by compounding the constituents A and B in the amounts given in Table 1 using a Coperion® ZSK25 twin-screw extruder (Tm 188° C.). Sample plaques (size: 200*140*4 mm) have been prepared via injection molding at 240° C.

Comparative Example 1 was prepared from constituent A-1 using a Coperion® ZSK25 twin-screw extruder. Sample plaques (size: 200*140*4 mm) have been prepared via injection molding at 240° C.

Example 3, Example 4, Comparative Example 3 and Comp. Ex. 4 were prepared by compounding the constituents A to D in the amounts given in Table 1 using a Coperion® ZSK25 twin-screw extruder (Tm 215° C.). Sample plaques (size: 200*140*4 mm) have been prepared via injection molding at 240° C.

Comparative Example 2 was prepared by compounding the constituents A and C in the amounts given in Table 1 using a Coperion® ZSK25 twin-screw extruder (Tm 210° C.). Sample plaques (size: 200*140*4 mm) have been prepared via injection molding at 240° C.

Example 5 was prepared by compounding the constituents A and B in the amounts given in Table 1 using a Coperion® ZSK25 twin-screw extruder. Sample plaques (200*140*4 mm) have been prepared via injection molding at 240° C.

Comparative Examples 6 and 7 have been prepared from constituents A3 and A*, respectively. Sample plaques (size: 200*140*4 mm) have been prepared via injection molding at 240° C.

TABLE 1

| Ex. No. | Const. A | Amount of Const. A [wt.-%] | Const. B | Amount of Const. B [wt.-%] | Const. C | Amount of Const. C [wt.-%] | Const. D | Amount of Const. D [wt.-%] |
|---|---|---|---|---|---|---|---|---|
| Ex. 1 | A-1 (SAN) | 99.75 | B-1 | 0.25 | — | 0 | — | 0 |
| Ex. 2 | A-1 (SAN) | 99.5 | B-1 | 0.5 | — | 0 | — | 0 |
| Comp. Ex. 1 | A-1 (SAN) | 100 | — | 0 | — | 0 | — | 0 |
| Ex. 3 | A-2 (AMSAN) | 95.97 | B-1 B-2 | 0.96 0.48 | C-2 | 1.24 | D-1 | 1.35 |
| Ex. 4 | A-2 (AMSAN) | 96.45 | B-1 B-2 | 0.48 0.48 | C-2 | 1.24 | D-1 | 1.35 |
| Comp. Ex. 2 | A-2 (AMSAN) | 97.45 | — | 0 | C-1 | 2.55 | — | 0 |
| Comp. Ex. 3 | A-2 (AMSAN) | 96.69 | B-1 B-2 | 0.24 0.48 | C-2 | 1.24 | D-1 | 1.35 |
| Comp. Ex. 4 | A-2 (AMSAN) | 96.92 | B-2 | 0.48 | C-2 | 1.25 | D-1 | 1.35 |
| Ex. 5 | A-3 (SMMA) | 99 | B-1 | 1 | — | 0 | — | 0 |
| Comp. Ex. 5 | A-3 (SMMA) | 100 | — | 0 | — | 0 | — | 0 |
| Comp. Ex. 6 | A* (PMMA) | 100 | — | 0 | — | 0 | — | 0 |

Testing Methods

The properties of the thermoplastic polymer compositions (P) were evaluated by the following testing methods. The same methods were applied to determine the properties of the constituents (A) to (D), where necessary.

Scratch Resistance

Scratch resistance was tested using an Erichsen Linear Tester (Model 249) equipped with an indenter according to ISO 1518-1 (hard metal coating). Prior to testing all samples have been conditioned at 23° C./50% r.h. for 48 h. The indenter was moved with a speed of 100 mm/s over the surface of the sample (35 or 55 mm scratch path length). The normal load (force of the indenter) is adjusted by using a balance in the following steps 50 g, 100 g, 150 g, 200 g, 300 g, 400 g, 500 g, 600 g, 700 g, 800 g, 900 g, 1000 g for performing scratches beside the previous tested loads. After scratching the surface is evaluated in direct visual examination in reflection of diffuse daylight and/or fluo-rescent tube light in a geometry of 0° to 85° to the perpendicular line of the surface. The minimum loads (in g) to first achieve a scratch mark on the surface are recorded. A full scratch is identified by color changes, reflections by the formed hollows or surface roughness in parts of the scratch area respectively shown in the complete scratched area. Additionally the scratch appearance as well as the minimum loads are compared to the base material.

Melt volume-flow rate (MVR 220° C./10 kg) was measured according to ISO 1133.

Viscosity number was measured according to DIN 53727 at 25° C. as 0.5 wt.-% solution in dimethylformamide (DMF).

Refractive Index was measured according to ASTM D 542 (sodium line).

Density was measured according to DIN EN ISO 1183.

Vicat softening temperature (VST B50) was measured according to DIN EN ISO 306.

The test results are summarized in Table 2.

TABLE 2

| No. | min. load for full scratch [g] |
| --- | --- |
| Ex. 1 | 800 |
| Ex. 2 | 400 |
| Comp. Ex. 1 | 100 |
| Ex. 3 | 700 |
| Ex. 4 | 400 |
| Comp. Ex. 2 | 50 |
| Comp. Ex. 3 | 50 |
| Comp. Ex. 4 | 50 |
| Ex. 5 | 500 |
| Comp. Ex. 5 | 150 |
| Comp. Ex. 6 | 600 |

The examples clearly show that the addition of aliphatic amide waxes according to the invention to different styrene-based copolymers has significant effects on the improvement of scratch resistance determined using test plaques prepared from the thermoplastic polymer composition (P) with an Erichsen Linear Tester 249 compared to the pure base resin.

Comp. Ex. 1 to 3 show a full scratch already at very low normal loads of 50 to 100 g. On the other hand Comp. Ex. 6, prepared from PMMA instead of styrene-based copolymer, is very scratch resistant. Full scratch is observed only at 600 g.

It was surprisingly found that by adding 0.1 to 10 wt.-% of aliphatic amide waxes to the styrene-based copolymer the normal load necessary to achieve a full scratch on the surface of the test sample can be significantly increased.

Examples 1 and 2 show that the addition of small amounts of a aliphatic amide wax composition having a melting point in the range of 80° C. to 115° C. results in an increase of scratch resistance of a SAN copolymer composition compared to the respective pure SAN copolymer (Comp. Ex. 1). The normal load to achieve full scratch is increased from 100 g (Comp. Ex. 1) to 400 g (Ex. 2) and 800 g (Ex. 1), respectively.

Examples 3 and 4 show that the addition of mixtures of one higher melting aliphatic amide wax (melting temperature of 80° C. to 115° C.) and one lower melting amide wax (melting temperature in the range of 35° C. to 60° C.) also results in significant improvements of the scratch resistance. 700 g (Ex. 3) and 400 g (Ex. 4), respectively, are necessary to result in a full scratch compared to 50 g (Comp. Ex. 2) for the AMSAN copolymer without added aliphatic amide wax. Surprisingly, it was found that the sole addition of a low melting amide wax with melting temperature in the range of 35° C. to 60° C. is not sufficient to improve the scratch resistance of the AMSAN copolymer composition (Comp. Ex. 4).

Moreover, it was surprisingly found that the advantageous effect of the amide wax mixture is only achieved if the weight ratio of the high melting aliphatic amide wax (melting temperature of 80° C. to 115° C.) to the lower melting amide wax (melting temperature in the range of 35 to 60° C.) is higher than about 0.9:1 (Ex. 3 and 4). Comp. Ex. 3, comprising an amide mixture having a weight ratio of 1:2 shows no improvements in scratch resistance compared to Comp. Ex. 2, comprising no aliphatic amide wax.

Finally, Ex. 5 and Comp. Ex. 5 show the improvement of scratch resistance of a SMMA copolymer composition comprising an aliphatic amide wax having a melting temperature of 80° C. to 115° C. compared to the pure SMMA copolymer.

The invention claimed is:

1. A thermoplastic polymer composition (P) comprising:
   (A) 90 to 99.9 wt.-% of at least one styrene-based copolymer;
   (B) 0.1 to 10 wt.-% of an aliphatic wax additive comprising at least one aliphatic amide wax composition (B-1) having a melting point in the range of 80° C. to 115° C. and at least one aliphatic fatty acid ester composition (B-2) having a melting point in the range of 35° C. to 60° C.;
   (C) 0 to 9.9 wt.-% of at least one colorant, dye, or pigment; and
   (D) 0 to 3 wt.-% of at least one further additive,
wherein:
   the constituents (A) to (D) sum up to 100 wt.-% of the thermoplastic polymer composition (P);
   the weight ratio (B-1) to (B-2) is ≥0.9:1 to ≤2.2:1; and
   the at least one styrene-based copolymer (A) is selected from poly(styrene-co-acrylonitrile) (SAN), poly(α-methyl styrene-co-acrylonitrile) (AMSAN), poly(styrene-co-methyl methacrylate) (SMMA), and mixtures thereof.

2. The thermoplastic polymer composition (P) according to claim 1 comprising:
   (A) 93 to 99.9 wt.-% of at least one styrene-based copolymer;
   (B) 0.1 to 7 wt.-% of an aliphatic wax additive comprising at least one aliphatic amide wax composition (B-1) having a melting point in the range of 80° C. to 115° C. and at least one aliphatic fatty acid ester composition (B-2) having a melting point in the range of 35° C. to 60° C.;

(C) 0 to 6.9 wt.-% of at least one colorant, dye, or pigment; and
(D) 0 to 3 wt.-% of at least one further additive,
wherein the constituents (A) to (D) sum up to 100 wt.-% of the thermoplastic polymer composition (P).

3. The thermoplastic polymer composition (P) according to claim 1 comprising:
(A) 95 to 99.8 wt.-% of at least one styrene-based copolymer;
(B) 0.2 to 5 wt.-% of an aliphatic wax additive comprising at least one aliphatic amide wax composition (B-1) having a melting point in the range of 80° C. to 115° C. and at least one aliphatic fatty acid ester composition (B-2) having a melting point in the range of 35° C. to 60° C.;
(C) 0 to 4.8 wt.-% of at least one colorant, dye, or pigment; and
(D) 0 to 3 wt.-% of at least one further additive;
wherein the constituents (A) to (D) sum up to 100 wt.-% of the thermoplastic polymer composition (P).

4. The thermoplastic polymer composition (P) of claim 1 comprising:
(A) 93 to 99.7 wt.-% of at least one styrene-based copolymer;
(B) 0.1 to 6.8 wt.-% of an aliphatic wax additive comprising at least one aliphatic amide wax composition (B-1) having a melting point in the range of 80° C. to 115° C. and at least one aliphatic fatty acid ester composition (B-2) having a melting point in the range of 35° C. to 60° C.;
(C) 0.1 to 5 wt.-% of at least one colorant, dye, or pigment; and
(D) 0.1 to 3 wt.-% of at least one further additive,
wherein the constituents (A) to (D) sum up to 100 wt.-% of the thermoplastic polymer composition (P).

5. The thermoplastic polymer composition (P) of claim 1 comprising:
(A) 95 to 98.8 wt.-% of at least one styrene-based copolymer;
(B) 0.2 to 2 wt.-% of an aliphatic wax additive comprising at least one aliphatic amide wax composition (B-1) having a melting point in the range of 80° C. to 115° C. and at least one aliphatic fatty acid ester composition (B-2) having a melting point in the range of 35° C. to 60° C.;
(C) 0.5 to 5 wt.-% of at least one colorant, dye, or pigment; and
(D) 0.5 to 3 wt.-% of at least one further additive,
wherein the constituents (A) to (D) sum up to 100 wt.-% of the thermoplastic polymer composition (P).

6. The thermoplastic polymer composition (P) according to claim 1, wherein:
the at least one aliphatic amide wax composition (B-1) comprises amide compounds having the formula $R^1$—CONH—$R^2$, wherein $R^1$ and $R^2$ are each independently selected from aliphatic, saturated or unsaturated hydrocarbon groups having 1 to 30 carbon atoms; and
the at least one aliphatic fatty acid ester composition (B-2) comprises fatty acid ester compounds having the formula $R^3$—CO—$OR^4$, wherein $R^3$ and $R^4$ are each independently selected from aliphatic, saturated or unsaturated hydrocarbon groups having 1 to 45 carbon atoms.

7. The thermoplastic polymer composition (P) according to claim 6, wherein:
the at least one aliphatic amide wax composition (B-1) comprises amide compounds having the formula $R^1$—CONH—$R^2$, wherein $R^1$ and $R^2$ are each independently selected from aliphatic, saturated or unsaturated hydrocarbon groups having 12 to 24 carbon atoms; and
the at least one aliphatic fatty acid ester composition (B-2) comprises fatty acid ester compounds having the formula $R^3$—CO—$OR^4$, wherein $R^3$ and $R^4$ are each independently selected from aliphatic, saturated or unsaturated hydrocarbon groups having 15 to 40 carbon atoms.

8. The thermoplastic polymer composition (P) according to claim 6, wherein:
the at least one aliphatic amide wax composition (B-1) comprises amide compounds having the formula $R^1$—CONH—$R^2$, wherein $R^1$ and $R^2$ are each independently selected from aliphatic, saturated or unsaturated hydrocarbon groups having 16 to 20 carbon atoms; and
the at least one aliphatic fatty acid ester composition (B-2) comprises fatty acid ester compounds having the formula $R^3$—CO—$OR^4$, wherein $R^3$ and $R^4$ are each independently selected from aliphatic, saturated or unsaturated hydrocarbon groups having 25 to 35 carbon atoms.

9. The thermoplastic polymer composition (P) according to claim 1, wherein an article prepared from the thermoplastic polymer composition (P) requires a minimum normal load of at least 300 g in a scratch resistance test following ISO 1518-1 realized with an Erichsen Linear Tester to achieve a full scratch mark on the surface of the article.

10. A process for the preparation of the thermoplastic polymer composition (P) according to claim 1, wherein the process comprises at least the following steps:
a) providing the components (A) to (D) in the predetermined amounts to an optionally heatable mixing device; and
b) blending the components (A) to (D) in the optionally heatable mixing device at temperatures above the glass transition point of the components (A) to (D) to obtain the thermoplastic polymer composition (P).

11. A polymer composition, comprising 50 to 99 wt.-% of the thermoplastic polymer composition (P) according to claim 1, and 50 to 1 wt.-% of at least one further thermoplastic polymer selected from polyolefins, polycarbonates, polyamides, and mixtures thereof.

12. A molded article, prepared from the thermoplastic polymer composition (P) according the polymer composition according to claim 11.

13. The molded article according to claim 12, wherein the molded article is prepared by an injection molding process.

14. A method of making components or articles for electronic devices, household goods, and automotive parts comprising the molded article according to claim 12.

15. The method according to claim 14, where the molded article is used in A/B/C pillars of automobiles.

16. A molded article, prepared from the thermoplastic polymer composition (P) according to claim 1.

17. The molded article according to claim 16, wherein the molded article is prepared by an injection molding process.

18. A method of making components or articles for electronic devices, household goods, and automotive parts comprising the molded article according to claim 16.

19. The method according to claim 18, where the molded article is used in A/B/C pillars of automobiles.

20. A method of making components or articles for electronic devices, household goods, and automotive parts comprising the thermoplastic polymer composition (P) according to claim 1.

* * * * *